Patented Apr. 6, 1926.

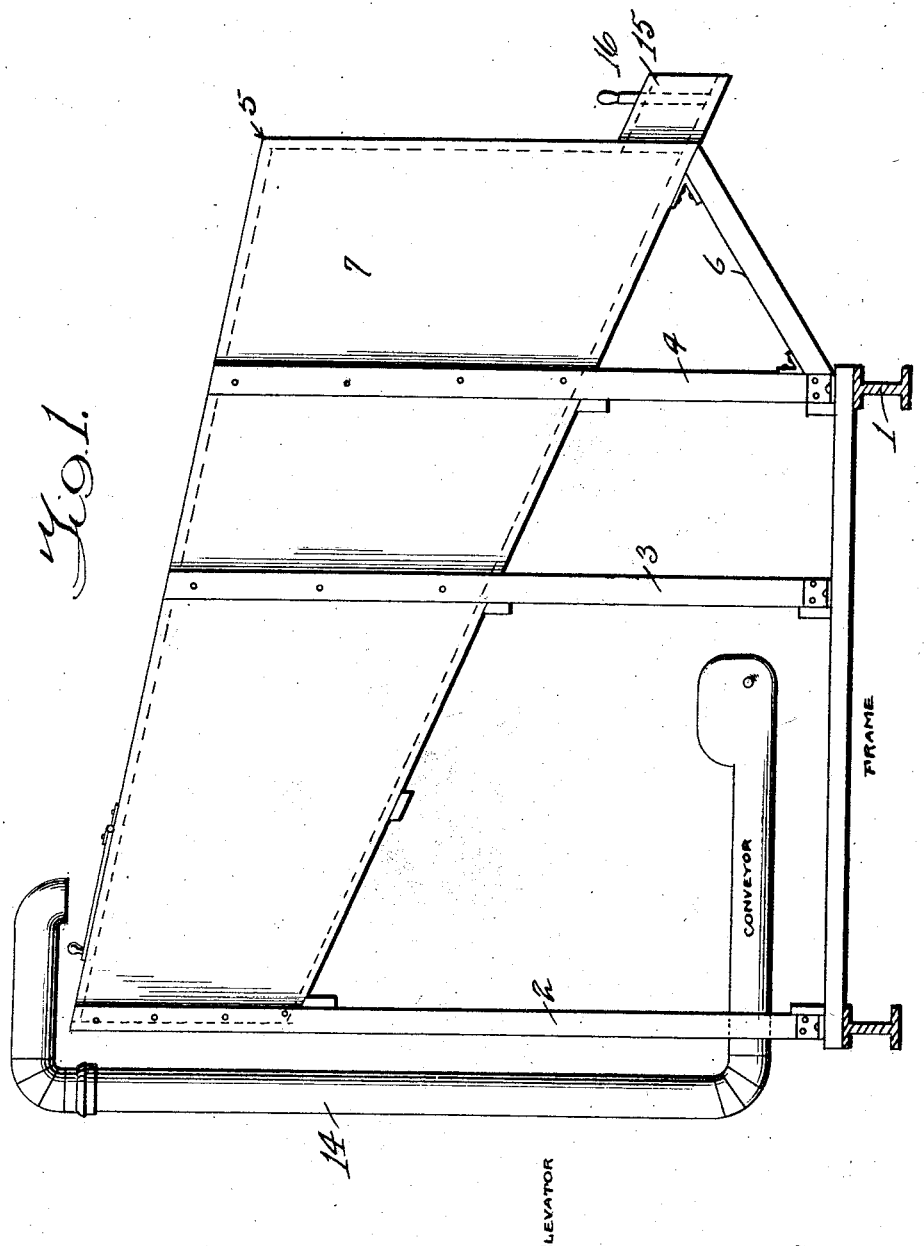

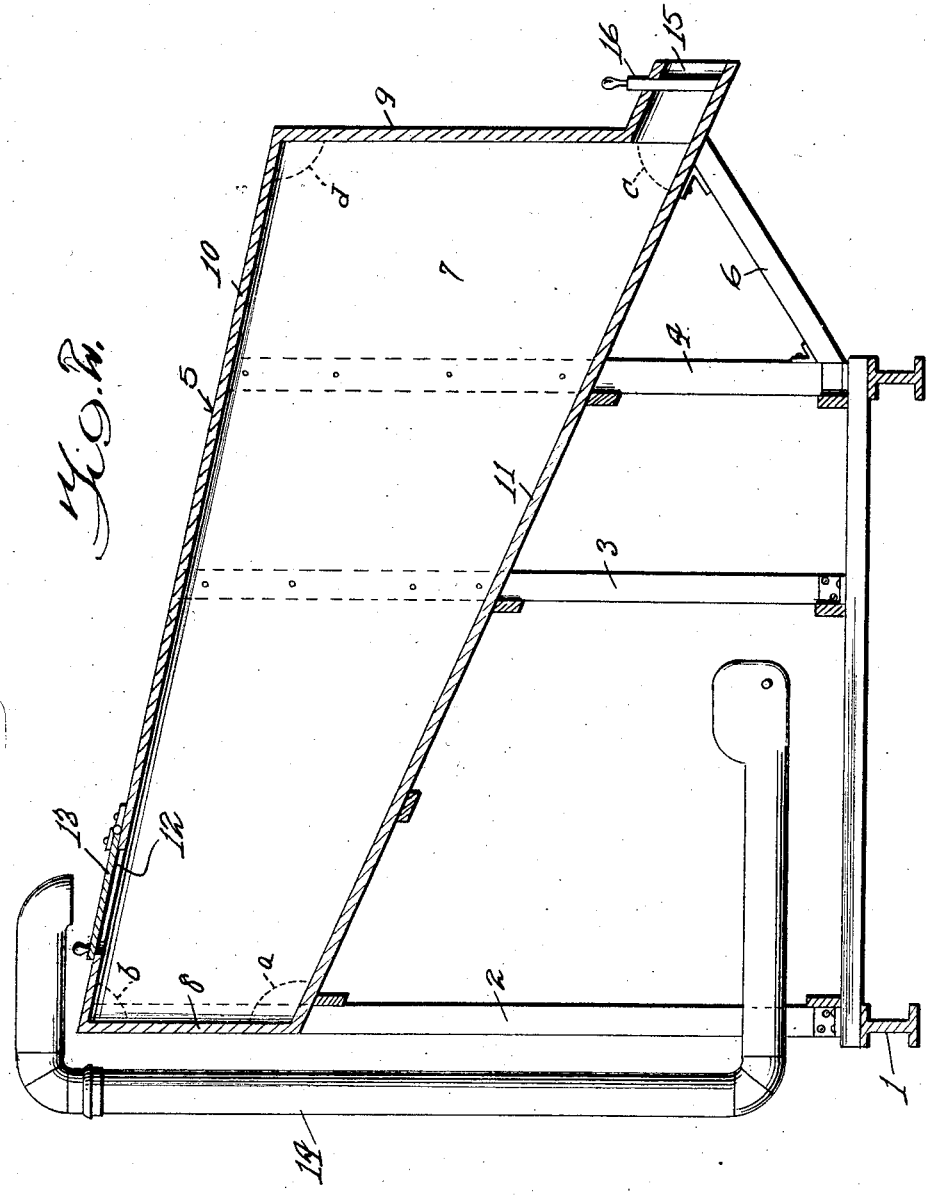

1,580,073

UNITED STATES PATENT OFFICE.

WALTER O. NOTHNAGEL, OF McCOOK, NEBRASKA.

GRAIN HOPPER.

Application filed September 9, 1922. Serial No. 587,074.

*To all whom it may concern:*

Be it known that I, WALTER O. NOTHNAGEL, a citizen of the United States, residing at McCook, in the county of Redwillow and State of Nebraska, have invented certain new and useful Improvements in Grain Hoppers, of which the following is a specification.

The present invention relates to a grain hopper for a combined harvester and separator and has for its principal object to provide means for temporarily storing the grain after it has been delivered from the combined harvester and separator thereby doing away with the necessity of using a wagon and also preventing considerable loss of grain.

It is the common custom to have the elevator of the combined harvester and separator empty its contents into a wagon and of course considerable is lost in changing wagon and great inconvenience is encountered but with my improvement the hopper is only emptied at the ends of the field while the machine is being oiled.

Another important object of the invention is to provide a device of this nature which will be simple and efficient in construction, reliable in operation, practically inexpensive to add a combined harvester and thrasher, durable, and well adapted to the purpose for which it is designed.

With the above and numerous other objects in view as will appear as the description progresses, the invention resides in certain novel features of construction and the combination and arrangement of parts as will be hereinafter more fully described and claimed.

In the drawings:

Figure 1 is a side view of the hopper and conveyer.

Figure 2 is a sectional view of the hopper shown in Fig. 1.

Referring to the drawings in detail it will be seen that 1 designates a portion of the combined harvester and separator on which standards 2, 3 and 4 are arranged, standards 2 preferably being situated at the inner end of the hopper 5, the standards 3 situated centrally thereof and the standards 4 being situated adjacent the outer end thereof. A pair of braces 6 extend from the bottom of the standards 4 to the outside of the hopper 5.

The sides 7 of the hopper 5 are trapezoid in shape while the ends 8 and 9 and the top 10 and bottom 11 are rectangular in shape. The angle at $a$ is an obtuse angle, while the angle $b$ is an acute angle. The angle at $c$ is an acute angle while the angle at $d$ is an obtuse angle.

It will therefore be noted that the slant of the bottom 11 from the end 8 is greater than the slant of the top 5, since the ends 8 and 9 are disposed vertically. An opening 12 is provided in the top 5 adjacent the end 8 and a hinged door is situated so as to close the opening 12 when desired. The elevator 14 from the combined harvester and separator extends over the top 5 so as to terminate immediately above the opening 12, whereby the grain may be delivered into the hopper when the combined harvester and separator is in operation. The purpose of the door 13 is to prevent rain water and the like getting into the hopper when the machine is not in use. At the lower edge of the outer end of the hopper there is provided a suitable spout 15 having therein a suitable valve mechanism 16. This spout and valve 16 are used for emptying the hopper 5 after the combined harvester and separator has reached the end of a field, it being understood that a wagon is moved under the spout 15 and the valve 16 open thereby allowing the grain to readily pour from the hopper because of the slanted bottom 11.

Having thus described my invention what I claim as new is:—

1. A device of the character described comprising a hopper including a pair of parallel trapezoidal sides, a bottom of substantially angular inclination, a top, closed ends, a valve mounted at the lowermost portion of the bottom, an opening formed in the top, a door adapted to cover the said opening, and a supporting frame secured to the said hopper for mounting the same upon a harvester or the like.

2. A device of the class described comprising a hopper composed of a pair of parallel trapezoidal side members, a bottom plate secured to the lower edge of the side members at an angular inclination, a top plate having a slight inclination but assuming a plane nearer the horizontal than the bottom, end plates adapted to enclose the said hopper, a chute formed at the lower extremity of the bottom, a valve mounted in the chute for controlling the passage of grain or the like, an opening formed in the top for the reception of grain, a supporting frame comprising a plurality of uprights, a plurality of braces adapted to securely retain the same in relation to the hopper, and means for readily mounting the said hopper and frame upon a harvester or the like.

3. A device of the class described comprising a substantially angular hopper, a delivery chute formed on the lower extremity of the hopper, a valve adapted to control the passage of matter through the chute, means for conveying matter into the upper end of the hopper, and a supporting frame comprising a plurality of horizontal connected foundation strips, a plurality of upwardly extending supports secured to the foundation strips and hopper, and a plurality of angular braces for securing the same to the hopper and means for mounting the said frame upon a harvester and separator or the like.

4. A device of the class described comprising a hopper composed of sides, ends, top and bottom, the said bottom being arranged at an angular inclination, elevated adjacent its rear end and assuming a substantially lowered position at its forward end, the forward end being provided with an opening and having a chute formed to extend outward thereof, the top also having an opening adjacent its rear end, a hinged cover arranged to enclose the said opening in the top, a vertically movable gate mounted in the chute to control the delivery of the material therethrough, and a supporting structure including a plurality of vertically arranged support bars secured to the forward, rear and intermediate portions of the hopper and a base frame adapted for convenient attachment upon a harvester.

In testimony whereof I affix my signature.

WALTER O. NOTHNAGEL.